United States Patent
Anderson

(10) Patent No.: US 8,214,148 B2
(45) Date of Patent: Jul. 3, 2012

(54) ADAPTIVE MOUNTING WITHIN AN INERTIAL NAVIGATION SYSTEM

(75) Inventor: Robert B. Anderson, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 855 days.

(21) Appl. No.: 12/271,675

(22) Filed: Nov. 14, 2008

(65) Prior Publication Data

US 2010/0125404 A1    May 20, 2010

(51) Int. Cl.
  *G01C 21/10* (2006.01)
(52) U.S. Cl. .......................... 701/500; 701/400
(58) Field of Classification Search .............. 701/200, 701/500
See application file for complete search history.

(56) References Cited

U.S. PATENT DOCUMENTS

| | | | |
|---|---|---|---|
| 3,565,386 A * | 2/1971 | Lemkuil et al. | 248/573 |
| 5,277,281 A | 1/1994 | Carlson et al. | |
| 6,029,959 A * | 2/2000 | Gran et al. | 267/136 |
| 6,371,434 B1 * | 4/2002 | Becker et al. | 248/610 |
| 6,578,682 B2 * | 6/2003 | Braman et al. | 188/378 |
| 6,871,561 B2 * | 3/2005 | Denice et al. | 73/866.5 |
| 7,364,022 B2 * | 4/2008 | Gordaninejad et al. | 188/267.2 |
| 7,584,660 B2 * | 9/2009 | Lysen | 73/493 |
| 7,874,407 B2 * | 1/2011 | Wereley et al. | 188/267.2 |
| 2002/0158390 A1 * | 10/2002 | Braman et al. | 267/140.13 |
| 2003/0167863 A1 * | 9/2003 | Denice et al. | 73/866.5 |
| 2007/0017758 A1 * | 1/2007 | Or et al. | 188/267.2 |

* cited by examiner

*Primary Examiner* — Mary Cheung
*Assistant Examiner* — Truc M Do
(74) *Attorney, Agent, or Firm* — Fogg & Powers LLC

(57) ABSTRACT

An inertial navigation system includes a housing mountable to a vehicle and a sensor assembly located within the housing. The sensor assembly includes at least one accelerometer or gyroscope operable to measure an amount of movement of the sensor assembly. In addition, at least one adjustable mount attaches the sensor assembly to the housing and is adjustable to change its stiffness, and thus its natural frequency, based on a signal initially generated by the sensor assembly, processed by a processor, and then received through a feedback control loop. In one embodiment, the adjustable mount may take the form of a piezoelectric device. In another embodiment, the adjustable mount may take the form of a magnetorheological fluid device.

12 Claims, 4 Drawing Sheets

ADAPTIVE MOUNTING WITHIN AN INERTIAL NAVIGATION SYSTEM

BACKGROUND OF THE INVENTION

Conventional Inertial Navigation Systems (INS) currently utilize a passive isolation system to protect an inertial sensor assembly (ISA), which houses one or more gyroscopes, accelerometers, or both. In turn, the ISA is coupled to a system chassis via multiple elastomeric isolators. In some systems, the elastomeric isolators may be configured to respond dynamically at a frequency dependent on acceleration input, temperature, geometry, mounting tolerances, or some combination thereof.

The performance of the INS may be affected by the frequency difference between the individual elastomeric isolators. By way of example, different elastomeric isolator sets must be selected based on the operational loads, thermal variants, and other factors affecting the INS. In some cases, mismatching the elastomeric isolator sets may result in a reduced operational life for one or more of the isolators and may further result in degraded system performance. In short, there may be many different configurations of the ISA using varying isolation frequencies and even though the isolators may be arranged as a "matched set" there may still be enough variance to cause system performance degradation.

SUMMARY OF THE INVENTION

The present invention general relates to changing a passive isolation system for an ISA to an adaptive system that would utilize feedback about its own motion to controllably adjust the frequency of each isolator to achieve a desired response for the ISA. In one embodiment, the adaptive ISA system includes a number of isolators each having a frequency that may be adjusted independently based on one or more inputs experienced by the ISA. Advantageously, the adaptive ISA system would include a single ISA with frequency adjustable isolators that may be selectively adjusted to meet a variety of operational environments or applications. Further, it is appreciated that many of the issues regarding dynamic balancing of the ISA, isolator preload effects, and non-linear strain problems may be substantially minimized, if not eliminated, because each isolator would be independently adjustable to achieve a desired stiffness for its respective location. In turn, the ISA would preferably have an accurately determined and desired amount of motion, which would yield improved navigational performance and a longer operational life.

In one aspect of the invention, an inertial navigation system includes a housing mountable to a vehicle; a sensor assembly located within the housing; and a plurality of isolators coupling the sensor assembly to the housing, each isolator adjustable to change a natural frequency of the isolator through a feedback control loop, wherein the feedback control loop receives an output value corresponding to a movement of the sensor assembly and generates an input value operable to change a stiffness of the isolator.

In another aspect of the invention, an adjustable mount for an inertial navigation system includes a first end portion attached to a sensor assembly; a second end portion attached to a chassis that houses the sensor assembly; and a portion of the mount located between the first and second end portions having a desired stiffness, wherein the desired stiffness is adjustable to change a natural frequency of the mount through a feedback control loop, and wherein the feedback control loop receives an output value corresponding to a movement of the sensor assembly and generates an input value operable to change the stiffness of the mount.

In yet another aspect of the invention, a method for changing a natural frequency of at least one adjustable mount attaching a sensor assembly to a chassis for an inertial navigation system, the method includes the steps of (1) detecting an amount of movement of the sensor assembly; (2) transmitting a signal indicative of the amount of movement to a processor; (3) evaluating the signal with the processor to generate a second signal operable to change a stiffness of the adjustable mount; and (4) transmitting the second signal to at least one adjustable mount.

BRIEF DESCRIPTION OF THE DRAWINGS

Preferred and alternative embodiments of the present invention are described in detail below with reference to the following drawings.

DETAILED DESCRIPTION OF ONE EMBODIMENT

Figure 1:
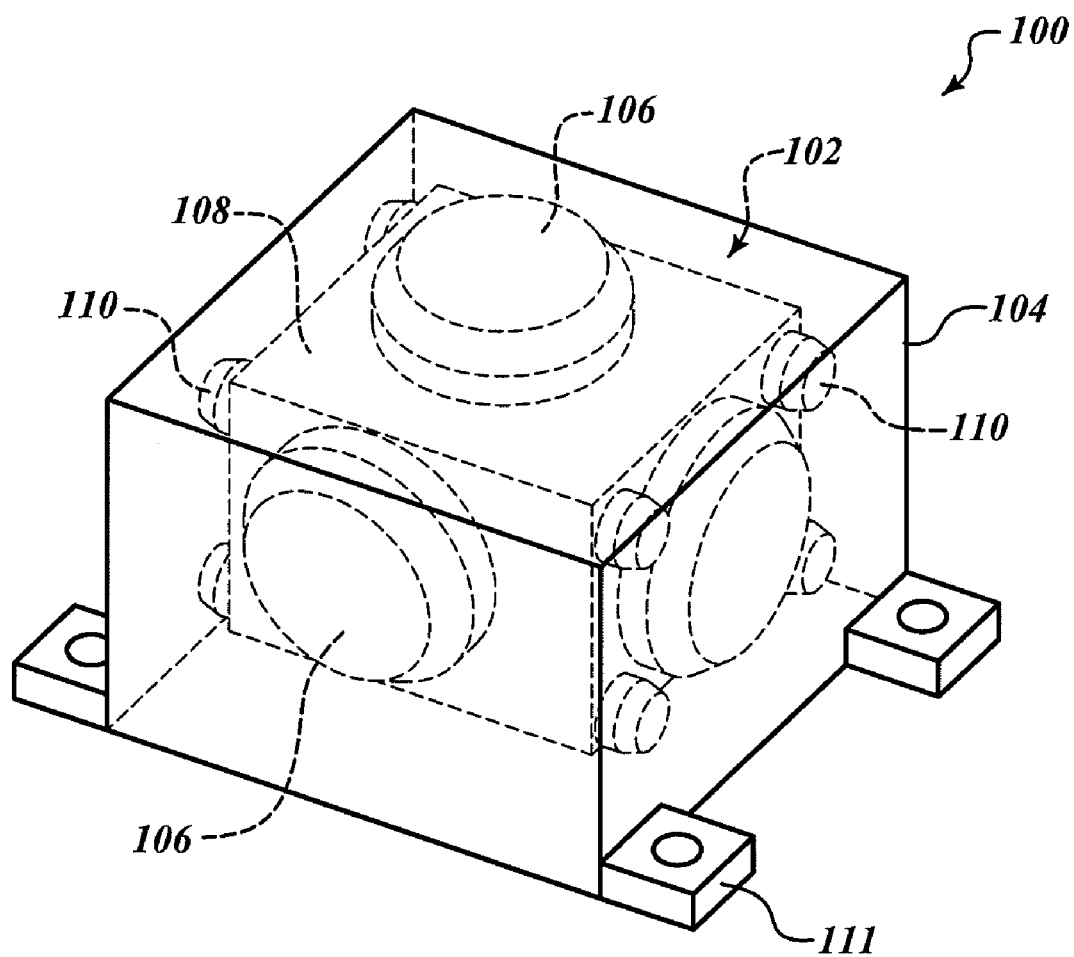
FIG. 1 is an isometric view of an inertial navigation system having an inertial sensor assembly coupled to a chassis using a number of adjustable mounts according to an illustrated embodiment of the invention.

FIG. 1 shows an inertial sensor unit 100 having an inertial sensor assembly (ISA) 102 mounted within a structural chassis or housing 104. In one embodiment, the inertial sensor unit 100 may be one of many units that are employed as part of an inertial navigation system (INS). The ISA 102 includes a plurality of sensors 106 coupled to an ISA body or mass 108. The sensors 106 may take the form of gyroscopes, accelerometers, or both. The ISA 102 is mounted within the chassis 104 in an isolated or suspended manner with a plurality of adjustable mounts 110 in which one portion of the adjustable mount 110 is coupled to the chassis 104 and a distal portion of the adjustable mount 110 is coupled to the ISA 102. In turn, the chassis 104 may include a number of mounting feet 111 for attaching the inertial sensor unit 100 to a portion of a vehicle.

Figure 2:
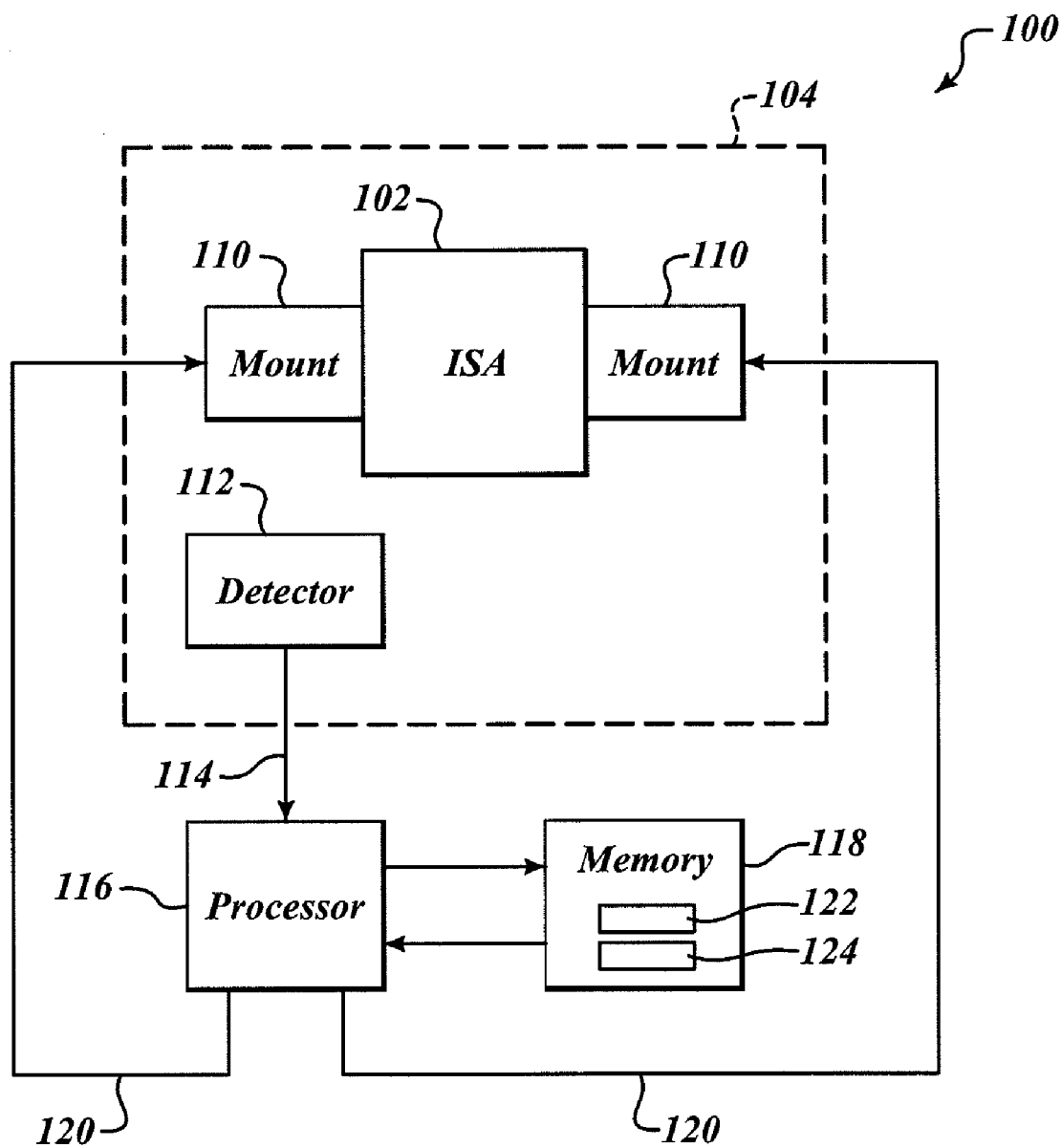
FIG. 2 is diagram of the inertial navigation system showing feedback control signals used to change a stiffness of the adjustable mounts according to an embodiment of the invention.

FIG. 2 shows adjustable mounts 110 configured to provide adaptive isolation for the ISA 102. By way of example, the adjustable mounts 110 may take the form of piezoelectric sensors 110 in communication with a detector 112 configured to detect an amount of pressure, acceleration, strain or force experienced by the ISA 102. The detector 112 transmits a first signal 114, such as an electric signal, corresponding to the detected amount of pressure, acceleration, strain or force. The first signal 114 may be received and processed by a controller or processor 116, which may cooperate with a memory 118 to evaluate the first signal 114 and determine an appropriate amount of adjustment, transmitted in the form of a second signal 120, to be applied to the adjustable mount 110. The memory 118 may include one or more databases having information about the ISA 102, the adjustable mount 110, and other aspects of the system 100. By way of example, the memory 118 may include an ISA database 122 having information related to the weight, dimensions, material, etc. of the ISA 102. Similarly, the memory 118 may include a mount database 124 having information related to the physical location, type, current settings, size, temperature, etc. for each of the adjustable mounts 110.

As noted, the processor 116 transmits the second signal 120 to the adjustable mounts 110 to change a desired characteristic, feature, parameter or other aspect of the adjustable mount 110. In one embodiment, the second signal 120 operates to change a stiffness of the adjustable mount 110, which in turns changes a natural frequency of the adjustable mount 110 to a desired natural frequency.

The piezoelectric sensor uses the piezoelectric effect to measure pressure, acceleration, strain or force by converting them to an electrical signal. In the present embodiment, the piezoelectric sensor may be configured to measure the strain or acceleration corresponding to movement of the ISA 102. Depending on the configuration of the piezoelectric sensor, it may be capable of measuring the pressure, acceleration, strain or force with respect to a transverse, a longitudinal, or a shear direction.

Figure 3:
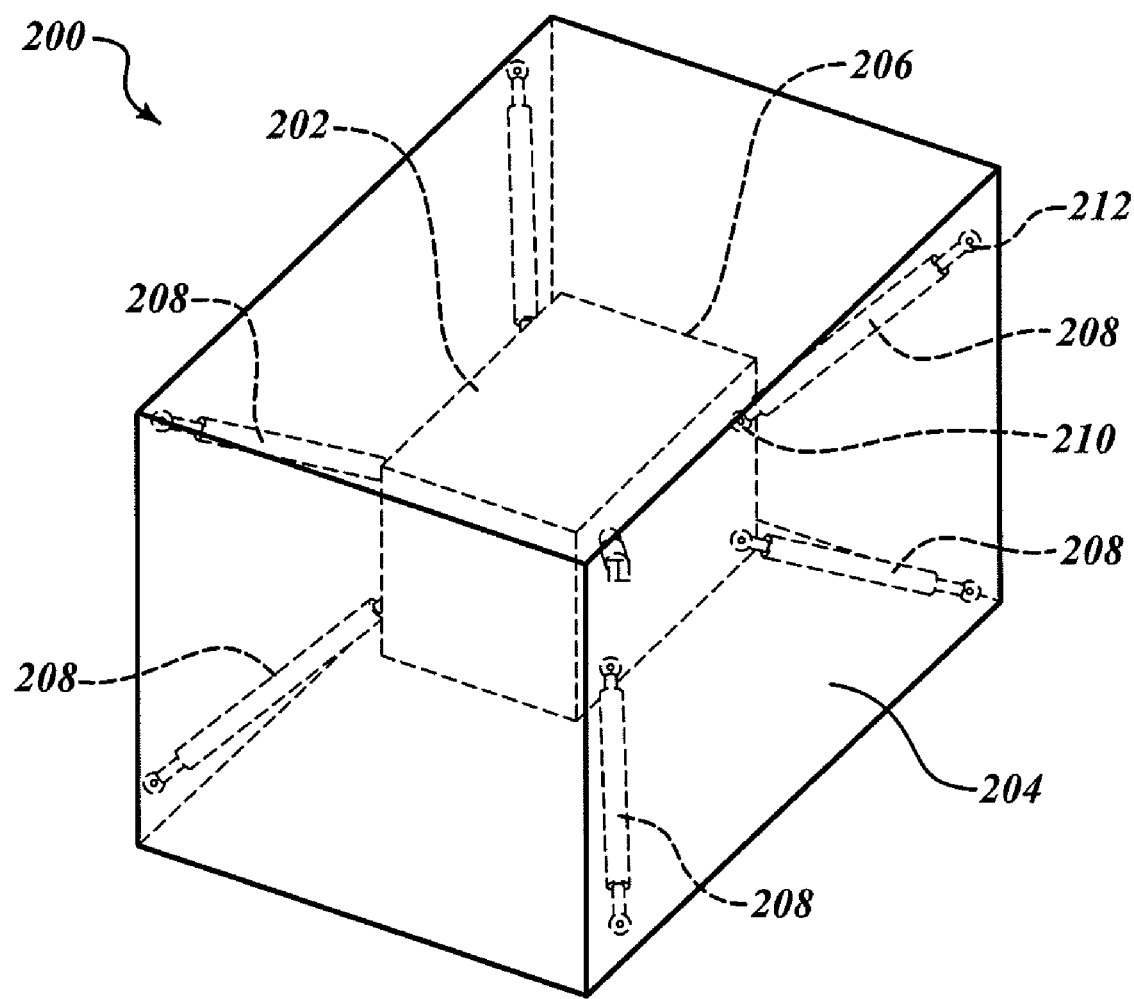
FIG. 3 is an isometric view of another inertial navigation system having an inertial sensor assembly coupled to a chassis using a number of adjustable mounts having an encapsulated fluid according to an illustrated embodiment of the invention.

FIG. 3 shows an inertial sensor unit 200 having an inertial sensor assembly (ISA) 202 mounted within a structural chassis or housing 204. In one embodiment, the inertial sensor unit 200 may be one of many units that are employed as part of an inertial navigation system (INS). The ISA 202 includes a plurality of sensors (not shown), which may be coupled to or encased within an ISA body or mass 206. The sensors may take the form of gyroscopes, accelerometers, or both. The ISA 202 is mounted within the chassis 204 in an isolated or suspended manner with a plurality of adjustable mounts 208.

Figure 4:
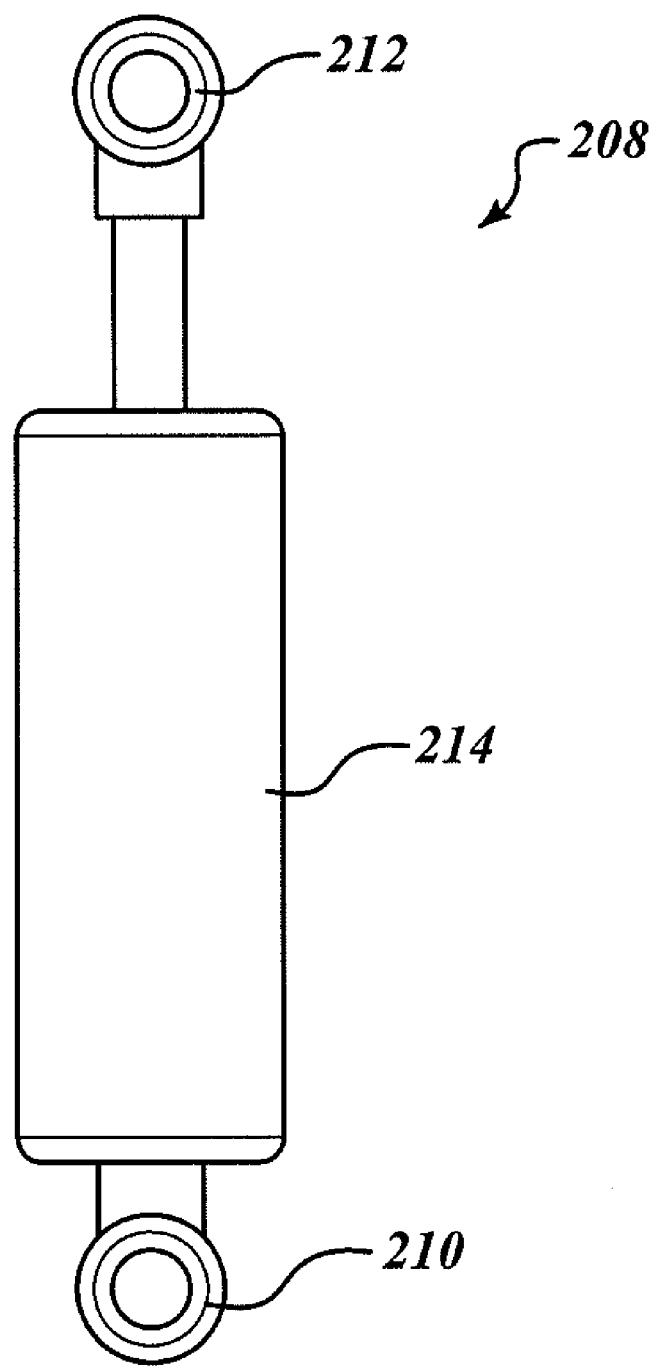
FIG. 4 is a side elevational view of one of the adjustable mounts of FIG. 3.

Briefly referring to FIG. 4 and yet still referring to FIG. 3, the adjustable mounts 208 may take the form of a magnetorheological fluid device having a first rod end 210 attachable to the ISA 202 and a second rod end 212 attached to the chassis 204. The magnetorheological fluid device operates when a magnetic field is applied to an encapsulated, magnetorheological (MR) fluid within a cylinder 214, which is located between the rod ends 210, 212. In one embodiment, the magnetorheological fluid device may be a compact magnetorheological fluid damper, such as the MR Damper™; model no. RD-1005-3, manufactured by LORD® Corporation. In another embodiment, the magnetorheological fluid device may take the form of the magneto-rheological fluid damper described in U.S. Pat. No. 5,277,281, which is incorporated herein in its entirety.

The MR fluid may reversibly and instantaneously change from a free-flowing liquid to a semi-solid with a controllable yield strength when exposed to the magnetic field. More specifically, the magnetic field causes iron particles in the MR fluid to align and form a more rigid structure, thus increasing the stiffness of the magnetorheological fluid device and in turn changing a natural frequency of the device. By way of example, the adjustable mounts 208 may advantageously respond instantly and controllably to varying levels of vibration, shock or motion.

In one embodiment with the magnetorheological fluid device installed, the acceleration of the ISA 202 may be transmitted to a processor, which in turn may determine how much to adjust the magnetic field (e.g., how much to change the stiffness of the device). It is appreciated that the MR fluid may change its characteristics quickly permitting each device in the system 200 to reach a desired stiffness almost instantaneously. By way of example, at least one known type of MR fluid can change its characteristics in less than 10 milliseconds.

In yet another embodiment, a smart material may be used for the adjustable mounts. The smart material may increase or decrease its stiffness based on amount of current applied to the respective mount. Similar to the above embodiment, the accelerometer and/or gyroscopic data from the ISA may be used to determine the amount of current to the smart material by way of a feedback control system.

While one embodiment of the invention has been illustrated and described, as noted above, many changes can be made without departing from the spirit and scope of the invention. Accordingly, the scope of the invention is not limited by the disclosure of one embodiment. Instead, the invention should be determined entirely by reference to the claims that follow.

The embodiments of the invention in which an exclusive property or privilege is claimed are defined as follows:

1. An inertial navigation system comprising:
    a housing mountable to a vehicle;
    an inertial sensor assembly located within the housing, the inertial sensor assembly configured to measure movement of the inertial sensor assembly; and
    a plurality of mounts coupling the inertial sensor assembly to the housing, each mount adjustable to change a natural frequency of the mount through a feedback control loop, wherein the feedback control loop receives a signal from the inertial sensor assembly that corresponds to a movement of the inertial sensor assembly and generates a respective input value for each of the plurality of mounts based on the signal from the inertial sensor assembly, each respective input value operable to change a characteristic of the respective mount which changes the natural frequency of the respective mount.

2. The inertial navigation system of claim 1, wherein the plurality of mounts are piezoelectric devices.

3. The inertial navigation system of claim 2, wherein the piezoelectric devices receive electrical signals from a processor in the feedback control loop.

4. The inertial navigation system of claim 1, wherein the plurality of mounts are magnetorheological fluid devices.

5. The inertial navigation system of claim 4, wherein the magnetorheological fluid devices receive signals from a processor in the feedback control loop, the signals operable to apply a desired magnetic field to fluid encapsulated within each of the magnetorheological fluid devices.

6. A method for changing a natural frequency of at least one adjustable mount attaching an inertial sensor assembly to a chassis for an inertial navigation system, the method comprising:
    detecting an amount of movement of the inertial sensor assembly with the inertial sensor assembly;
    transmitting a signal from the inertial sensor assembly to a processor, the signal indicative of the amount of movement of the inertial sensor assembly detected by the inertial sensor assembly;
    evaluating the signal from the inertial sensor assembly with the processor to generate a respective second signal operable to change a parameter of the at least one adjustable mount; and
    transmitting the respective second signal to the at least one adjustable mount.

7. The method of claim 6, wherein detecting the amount of movement of the sensor assembly includes measuring the amount of movement with at least one accelerometer.

8. The method of claim 6, wherein detecting the amount of movement of the sensor assembly includes measuring the amount of movement with at least one gyroscope.

9. The method of claim 6, wherein transmitting the signal includes transmitting an electrical signal.

10. The method of claim 6, wherein evaluating the signal with the processor includes accessing at least one database that includes parameters associated with sensor assembly.

11. The method of claim 6, wherein evaluating the signal with the processor includes accessing at least one database that includes parameters associated with the at least one adjustable mount.

12. The method of claim 6, further comprising:
applying a magnetic field to a fluid encapsulated within the at least one adjustable mount; wherein the second signal transmitted to the at least one adjustable mount changes the magnetic field which changes the parameter of the at least one adjustable mount.

* * * * *